United States Patent [19]
Chen et al.

[11] Patent Number: 5,659,462
[45] Date of Patent: Aug. 19, 1997

[54] ENCAPSULATED, INTEGRATED POWER MAGNETIC DEVICE AND METHOD OF MANUFACTURE THEREFOR

[75] Inventors: Shiaw-Jong Steve Chen, Plano; Ashraf Wagih Lotfi; Robert Joseph Roessler, both of Rowlett, all of Tex.; John David Weld, Succasunna, N.J.

[73] Assignee: Lucent Technologies Inc., Murray Hill, N.J.

[21] Appl. No.: 640,583

[22] Filed: Apr. 12, 1996

[51] Int. Cl.⁶ .................................................. H02M 7/521
[52] U.S. Cl. .................................................. 363/21
[58] Field of Search ........................ 340/870.28, 870.29, 340/870.3, 825.72; 363/21, 20, 131–132, 147

[56] References Cited

U.S. PATENT DOCUMENTS

| | | |
|---|---|---|
| 4,635,179 | 1/1987 | Carsten ........................... 363/70 |
| 5,371,496 | 12/1994 | Tanamachi ...................... 340/870.28 |

OTHER PUBLICATIONS

U.S. Patent Application, Serial No. 08/385,495 filed on Feb. 8, 1995 by Lotfi, et al, entitled "High Frequency Surface Mount Transformer Diode Power Module," commonly assigned.

*Primary Examiner*—Aditya Krishnan

[57] ABSTRACT

A power magnetic device, a method of manufacture therefor and a power converter. The power magnetic device includes: (1) an isolation transformer having a primary winding and a secondary winding, (2) a switch coupled to the primary winding, (3) a rectifier coupled to the secondary winding and (4) an encapsulant substantially surrounding the isolation transformer, the switch and the rectifier to join the isolation transformer, the switch and the rectifier into an integrated package, the integrated package having: (a) a first power input coupled to a first end of the primary winding, (b) a second power input coupled to the switch, (c) first and second power outputs coupled to the rectifier circuit and (d) a control input coupled to the switch, the control input allowing the switch to be controlled to couple the primary winding to a source of electrical power, the power magnetic device thereby capable of employing the isolation transformer and the rectifier to convert electrical power into DC electrical power.

21 Claims, 5 Drawing Sheets

ENCAPSULATED, INTEGRATED POWER MAGNETIC DEVICE AND METHOD OF MANUFACTURE THEREFOR

TECHNICAL FIELD OF THE INVENTION

The present invention is directed, in general, to power supplies and, more specifically, to an encapsulated, integrated power magnetic device and method of manufacture therefor.

BACKGROUND OF THE INVENTION

A power converter is a power processing circuit that converts an input voltage waveform into a specified output voltage waveform. In many applications requiring a DC output, switched-mode DC/DC converters are frequently employed to advantage. DC/DC converters generally include an inverter, an input/output isolation transformer and a rectifier on a secondary side of the isolation transformer. The inverter generally includes a switching device, such as a field effect transistor ("FET"), that converts the DC input voltage to an AC voltage. The input/output isolation transformer, then, transforms the AC voltage to another value and the rectifier generates the desired DC voltage at the output of the power converter.

Conventionally, the rectifier comprises a plurality of rectifying diodes that conduct the load current only when forward-biased in response to the input waveform to the rectifier. Alternatively, a more efficient rectifier can be attained in converters by replacing the rectifying diodes with active switches, such as FETs. The switches are periodically toggled between conduction and nonconduction modes in synchronization with the periodic waveform to be rectified. A rectifier employing active switches is conventionally referred to as a synchronous rectifier.

When the input voltage is, for instance, stepped down across a step-down isolation transformer in the power converter, the current capacity required on the secondary side of the transformer and the rectifier is significantly higher than that on the primary side of the transformer. As a result, the power converter suffers efficiency losses on the secondary side of the isolation transformer that impair the overall performance of the power converter. The path between the isolation transformer and the rectifier is of acute interest because it carries high AC that is subject to onerous losses. Furthermore, the path between the inverter and the isolation transformer and, especially, the path between the isolation transformer and the rectifier realize stray inductances that also impair the efficiency of the power converter. Therefore, efforts to minimize the losses associated with the paths between the inverter or switch, isolation transformer and the rectifier would improve the overall performance of the power converter.

In addition to efficiency improvements, increased power density is a continuing goal of modern power supply (e.g., power converter) design. High power density is particularly crucial in applications wherein the allocated space for the power supply relative to the power output is restricted. In addition to being highly compact, the power supply should be efficient to limit heat-creating power dissipation. To dissipate the heat generated in the power supply, typically, heat sinks are mounted on the power supply components. Individual heat sinks for the discrete components of the power converter raise some concerns, namely, it creates additional costs that cannot be readily absorbed in a cost competitive market; also, it decreases the flexibility necessary to design a higher circuit density power supply.

As those of ordinary skill in the art understand, it is, therefore, highly desirable to provide a protective, heat-dissipating package for the electronic circuitry of the power supply. Often, such circuitry can be encapsulated or "molded," wherein an encapsulant is formed about the circuitry to yield a unitary, board-mountable package. One well known configuration for board-mountable package is a so-called dual in-line package ("DIP"), wherein electrical leads protrude from opposing sidewalls of the package. The leads are advantageously so arranged to allow the package to be mounted to a circuit board by various conventional soldering processes. DIPs are widely used for packaging integrated circuits, most often in computer-related environments.

The advantage of packaging discrete power components into an integrated power module has been addressed in the prior art. More specifically, a surface-mounted transformer-diode power module is disclosed in a U.S. patent application, Ser. No. 08/385,495, filed on Feb. 8, 1995, by Lotfi, et al., entitled "High Frequency Surface Mount Transformer-Diode Power Module," commonly assigned with the present invention and incorporated herein by reference. Lotfi, et al. discloses a transformer-diode module that packages a transformer and diode into a single module to take advantage of higher power density and improved electrical performance by coupling the two discrete components together. However, Lofti, et al. may be improved upon to further increase the power density and electrical performance of a power supply device incorporating multiple power components.

Accordingly, what is needed in the art is an integrated power module, including an inverter or switch, transformer and rectifier, in an encapsulated, integrated package that may be implemented in a high power density and high performance power supply.

SUMMARY OF THE INVENTION

To address the above-discussed deficiencies of the prior art, the present invention provides a power magnetic device and method of manufacture therefor. The power magnetic device includes: (1) an isolation transformer having a primary winding and a secondary winding, (2) a switch coupled to the primary winding, (3) a rectifier coupled to the secondary winding and (4) an encapsulant substantially surrounding the isolation transformer, the switch and the rectifier to join the isolation transformer, the switch and the rectifier into an integrated package, the integrated package having: (a) a first power input coupled to a first end of the primary winding, (b) a second power input coupled to the switch, (c) first and second power outputs coupled to the rectifier circuit and (d) a control input coupled to the switch, the control input allowing the switch to be controlled to couple the primary winding to a source of electrical power, the power magnetic device thereby capable of employing the isolation transformer and the rectifier to convert electrical power into DC electrical power.

The power magnetic device couples the isolation transformer, the switch and the rectifier into an integrated package. The integrated power magnetic device therefore decreases the path between the inverter or switch and the isolation transformer and the path between the isolation transformer and the rectifier to thereby reduce the stray inductances that impair the efficiency of a power supply employing the power magnetic device to advantage. As a result, the power magnetic device eliminates the requirement of employing additional circuitry (e.g., a snubber circuit) in the power supply employing the device to obviate the stray leakage inductances therein. Finally, the power magnetic device integrates the discrete components into a single module to take advantage of higher power density and, ultimately, a highly compact board-mountable power magnetic device.

In one embodiment of the present invention, the power magnetic device further comprises a heat sink coupled to the secondary winding of the isolation transformer for thermal transfer therebetween. Incorporating the heat sink into the power magnetic device increases the flexibility necessary to design a highly compact board-mountable power magnetic device for use in higher circuit density power supplies.

In one embodiment of the present invention, the power magnetic device further comprises a lead frame containing the first and second power inputs and outputs and the control input and wherein a first terminal of the switch is soldered to the lead frame and second and third terminals of the switch are wire bonded to the lead frame. In a manner to be described later, the lead frame serves as a foundation to construct the power magnetic device around and the terminals or leads thereon provide the mechanism for power and control terminal connections and connection to power supply circuitry. The electrical leads coupled to the power supply circuitry and protruding from the package allow a power supply, incorporating the power magnetic device and power supply circuitry, to be mounted to a circuit board. The leads are thus available for conventional soldering processes. One of ordinary skill in the art will understand that other construction techniques and embodiments are well within the scope of the present invention.

In one embodiment of the present invention, the switch is a field-effect transistor ("FET"). Alternatively, other switches are well within the broad scope of the present invention.

In one embodiment of the present invention, the rectifier comprises a plurality of diodes. As an alternative to discrete diodes, the present invention may employ active switches, such as FETs to advantage.

In one embodiment of the present invention, the encapsulant is a thermosetting epoxy molding compound. Those of ordinary skill in the art are aware of the conventional use of such compound for encapsulating electronic circuitry.

In one embodiment of the present invention, the power magnetic device further comprises power supply circuitry, the power magnetic device and power supply circuitry surrounded by the encapsulant thereby forming a power supply module. Thus, the power magnetic device may form a portion of a power supply. In this environment, the present invention provides an encapsulated power supply module that may be mounted to a circuit board as easily and conventionally as any other electronic circuitry.

Another aspect of the present invention is a power converter comprising control circuitry and a power train having an input couplable to a source of electrical power and an output couplable to an electrical load. The power train employs an integrated power magnetic device and an encapsulant substantially surrounding the power magnetic device into an integrated package. The integrated power magnetic device is constructed according to the present invention as broadly defined herein.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
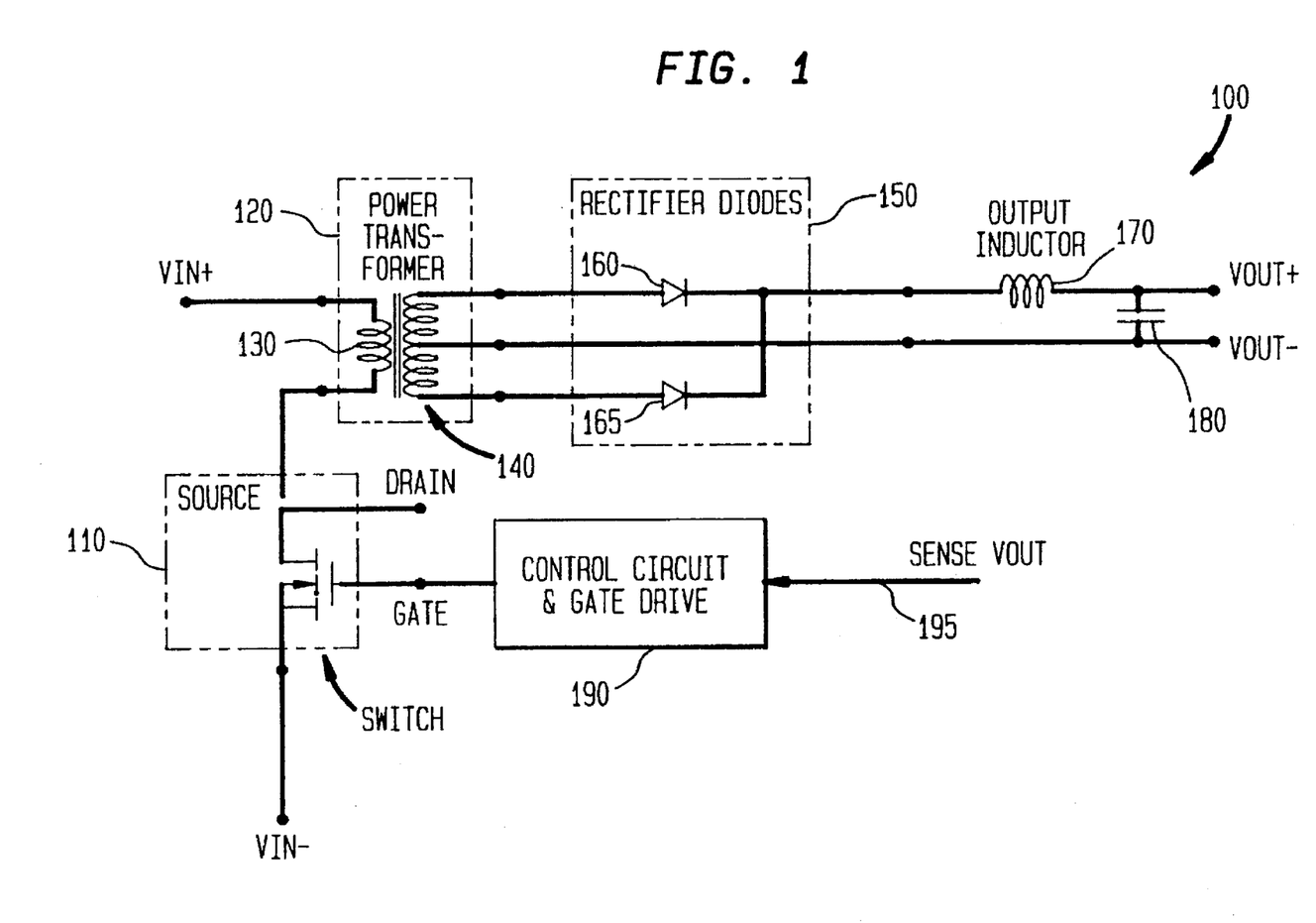
FIG. 1 illustrates a schematic diagram of a power converter employing discrete components.

Referring initially to FIG. 1, illustrated is a schematic diagram of a power converter 100 employing discrete components. The power converter 100 includes a power switch field effect transistor ("FET") 110 connected to and periodically switched to apply an input voltage $V_{in}$ to a primary winding 130 of a power transformer 120. A secondary winding 140 of the power transformer 120 is connected to a rectifier 150 comprising a pair of rectifier diodes 160, 165. The rectifier diodes 160, 165 rectify the periodic waveform supplied to the rectifier 150 by the secondary winding 140. A low-pass filter comprising an inductor 170 and a capacitor 180 act on the rectified waveform to supply a DC output voltage $V_{out}$. A control and drive circuit 190 senses the output voltage $V_{out}$ via a lead 195 and produces a pulse train of the proper duty ratio to drive the power switch FET 110.

The power converter 100 employs discrete components to convert the input voltage $V_{in}$ to the desired DC output voltage $V_{out}$. The use of discrete components leads to unnecessary losses in the power converter 100. More specifically, the paths between the power transformer 120 and the power switch FET 110 and the rectifier 150 realize stray inductances that impair the efficiency of the power converter 100. Therefore, efforts to minimize the losses associated with the paths between the power switch FET 110, power transformer 120 and the rectifier 150 would improve the overall performance of the power converter 100. In addition to efficiency improvements, minimizing the paths between the power switch FET 110, power transformer 120 and the rectifier 150 would increase the power density associated with these discrete components.

Figure 2:
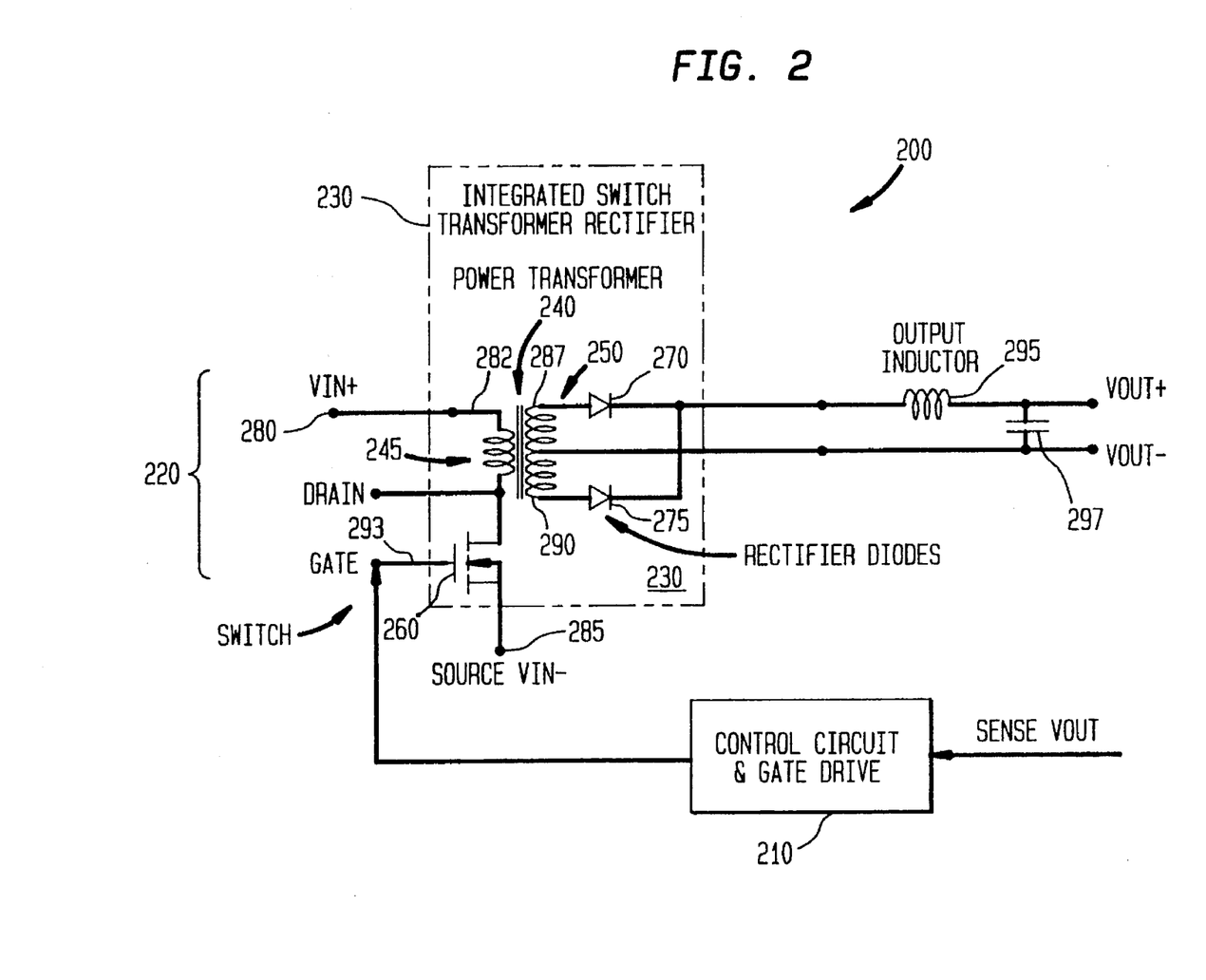
FIG. 2 illustrates a schematic diagram of a power converter employing integrated power circuitry in accordance with the principles of the present invention.

Turning now to FIG. 2, illustrated is a schematic diagram of a power converter 200 employing integrated power circuitry (i.e., an integrated power magnetic device) 230 in accordance with the principles of the present invention. The power converter 200 comprises control circuitry 210 for applying control signals to a power train 220. The power train 220 has a DC input $V_{in}$ coupled to a source of electrical power (not shown) and a DC output $V_{out}$ coupled to an electrical load (not shown). The power train 220 includes the integrated power magnetic device 230 comprising an isolation transformer 240 having a primary winding 245 and secondary winding 250. The integrated power magnetic device 230 also includes a power switch FET 260 coupled to the primary winding 245 of the isolation transformer 240. The integrated power magnetic device 230 further includes a rectifier comprising a pair of rectifier diodes 270, 275 coupled to the secondary winding 250 of the isolation transformer 240. The rectifier diodes 270, 275 rectify the periodic waveform supplied thereto by the secondary winding 250.

An encapsulant (see FIG. 3) substantially surrounds the isolation transformer 240, power switch FET 260 and rectifier diodes 270, 275 to join the isolation transformer 240, power switch FET 260 and rectifier diodes 270, 275 into an integrated package. The integrated package or power magnetic device 230 has a first power input 280 coupled to a first end 282 of the primary winding 245 and a second power input 285 coupled to the power switch FET 260. The integrated power magnetic device 230 also has first and second power leads 287, 290 coupled to the rectifier diodes 270, 275, respectively. The integrated power magnetic device 230 still further has a control input 293 that couples the control circuitry 210 to the power switch FET 260. The control input 293 allows the control circuitry 210 to control the power switch FET 260 to couple the primary winding 245 to the source of electrical power. A low-pass filter comprising an inductor 295 and a capacitor 297 act on the rectified waveform to supply the DC output voltage $V_{out}$. The integrated power magnetic device 230 employs the isolation transformer 240 and rectifier diodes 270, 275 to convert an AC electrical power into DC electrical power.

The integrated power magnetic device 230 therefore decreases the path between the power switch FET 260 and the isolation transformer 240 and the path between the isolation transformer 240 and the rectifier diodes 270, 275 to thereby reduce the stray inductances that impair the efficiency of the power converter 200 employing the integrated power magnetic device 230 to advantage. As a result, the integrated power magnetic device 230 reduces the requirement of employing additional circuitry (e.g., a snubber circuit) in the power converter 200 employing the device 230 to obviate the stray leakage inductances therein. Finally, the integrated power magnetic device 230 integrates the discrete components into a single module to take advantage of higher power density and, ultimately, a highly compact board-mountable power magnetic device.

Although the integrated power magnetic device 230 employs the power switch FET 260, alternatively, other switches (e.g., bipolar transistors) are well within the broad scope of the present invention. Also, while the integrated power magnetic device 230 employs the rectifier diodes 270, 275, alternatively, other rectifying devices and circuits (e.g., active switches, such as FETs, in a synchronous rectifier) may be employed to advantage.

Additionally, the integrated power magnetic device 230 and other power supply circuitry may be surrounded by the encapsulant to thereby form a power converter module. In this environment, the present invention provides an encapsulated power converter 200 that may be mounted to a circuit board as easily and conventionally as any other electronic circuitry.

Figure 3:
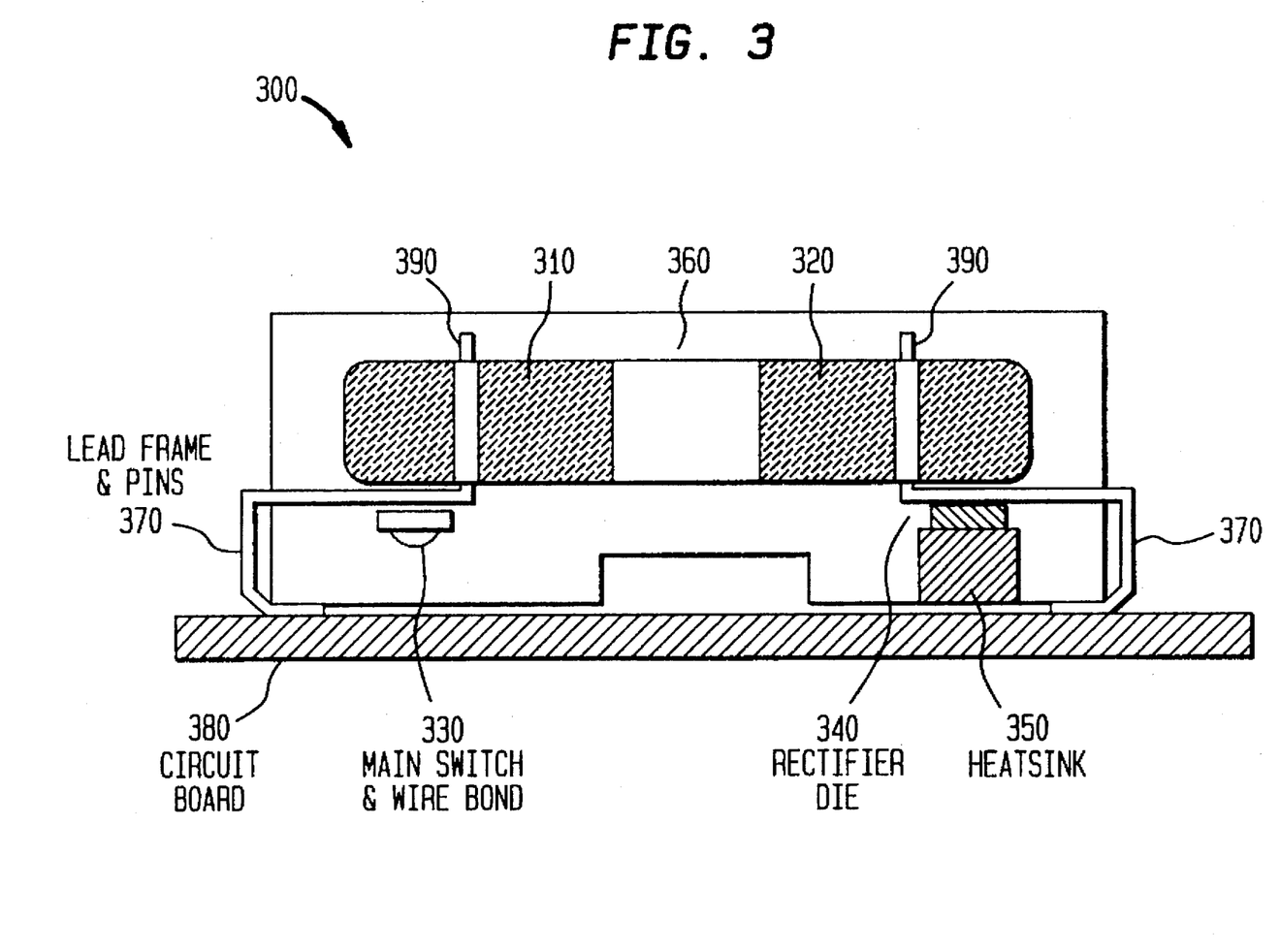
FIG. 3 illustrates a cross sectional view of integrated power circuitry in accordance with the principles of the present invention.

Turning now to FIG. 3, illustrated is a sectional view of integrated power circuitry (i.e., an integrated power magnetic device) 300 in accordance with the principles of the present invention. The integrated power magnetic device 300 includes an isolation transformer comprising multilayer flexible primary and secondary windings 310, 320. The integrated power magnetic device 300 also includes a switch 330 coupled to the primary winding 310. The integrated power magnetic device 300 further includes a rectifier 340 coupled to the secondary winding 320. The integrated power magnetic device 300 still further includes a heat sink 350 coupled to the rectifier 340 of the isolation transformer for thermal transfer therebetween.

An encapsulant 360 substantially surrounds the isolation transformer, switch 330, rectifier 340 and heat sink 350 to join the isolation transformer, switch 330, rectifier 340 and heat sink 350 into an integrated package. The encapsulant 360 is a thermosetting epoxy molding compound. Those of ordinary skill in the art are aware of the conventional use of such compounds for encapsulating electronic circuitry, although other encapsulating materials are well within the broad scope of the present invention.

The rectifier 340 is connected to a lead frame 370 (providing the foundation for the integrated power magnetic device 300) by a copper bar (not shown). The copper bar therein connects the rectifier 340 electrically to circuitry external to and thermally to the heat sink 350 of the integrated power magnetic device 300. The switch 330 is electrically connected by both solder and wire bonding to the lead frame 370. The integrated power magnetic device 300 is thermally connected to a circuit board or printed wiring board ("PWB") 380 by the wider drain tab portion (not shown) of the lead frame 370. The drain tab provides an enhanced thermal transfer path between the integrated power magnetic device 300 and the PWB 380. To accommodate the silicon die of the switch 330 and rectifier 340, the lead frame 370 is designed to have partial 0.200"×0.200" pads (not shown), intermixed with mounting pins 390 associated with the lead frame 370. These pads provide a planar soldering surface for the die. The lead frame mounting pins 390 are bent upwards for connection to the primary and secondary transformer windings 310, 320.

Figure 4:
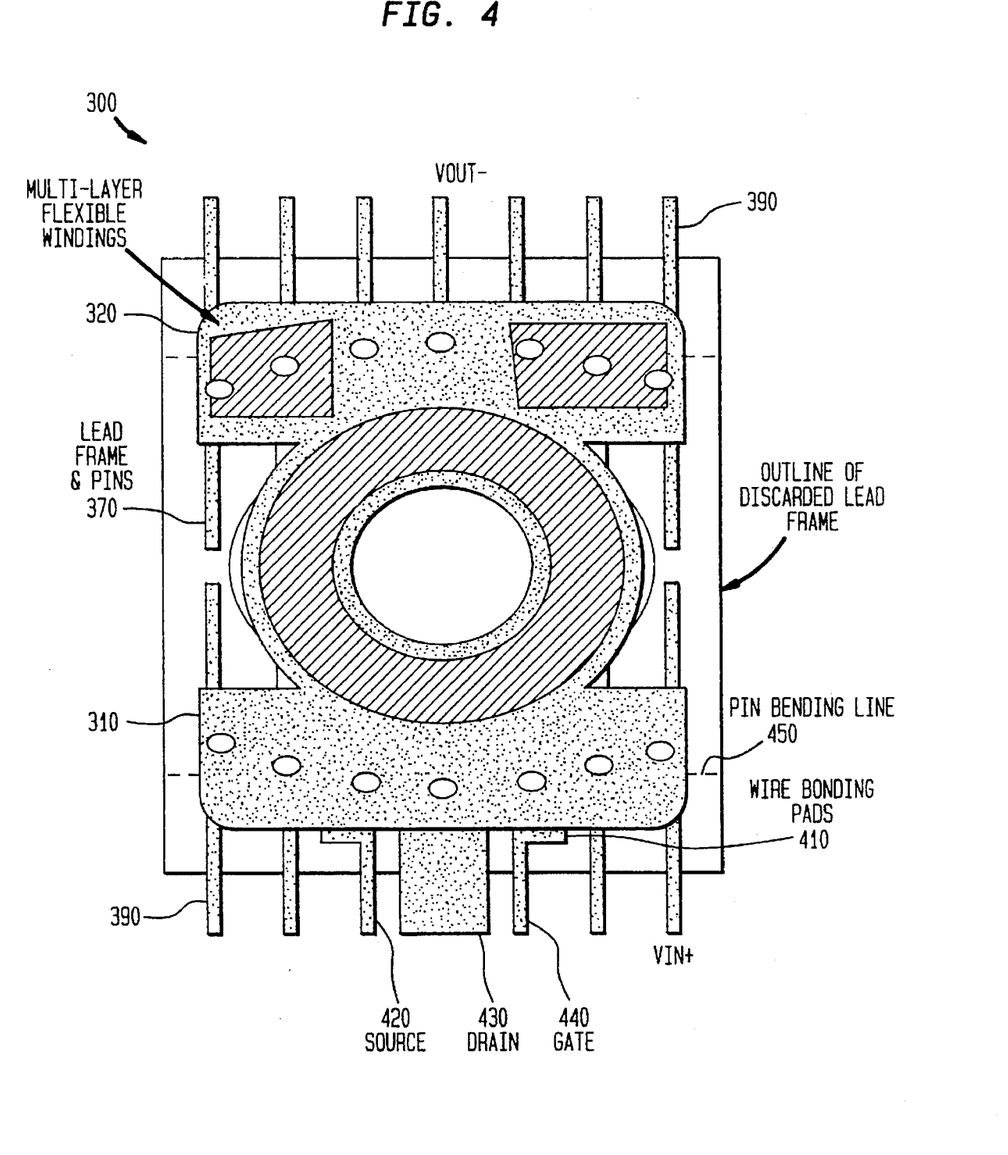
FIG. 4 illustrates a top view of the integrated power circuitry of FIG. 3.

Turning now to FIG. 4, illustrated is a top view of the integrated power circuitry (i.e., the integrated power magnetic device) 300 of FIG. 3. The illustrated embodiment presents the isolation transformer, comprising the multilayer flexible transformer primary and secondary windings 310, 320, and electrodes (a source 420, drain 430 and gate 440 electrode) of the switch coupled to the primary winding 310. Again, the lead frame 370 provides the foundation for the integrated power magnetic device 300; the mounting pins 390 provide the mechanism for the attachment of the windings 310, 320, and the control (via the gate electrode 440) and input and output voltages $V_{in}$, $V_{out}$ for the integrated power magnetic device 300.

The dimensions of the mounting pins 390 and bend radii are comparable to those used in a standard transformer to preserve compatibility with current transformer manufacturing procedures. To develop a single integrated power magnetic device 300 module, the windings 310, 320 and lead frame 370 are encapsulated in a thermoset molding compound. The encapsulant (see FIG. 3) generally has three cavities to accommodate the integrated devices attached to the lead frame 370. Additionally, wire bonding pads 410 provide a planar soldering surface for the source 420 and gate 440 of the switch and a pin bending line 450 provides a bending location for the mounting pins 390.

Figure 5:
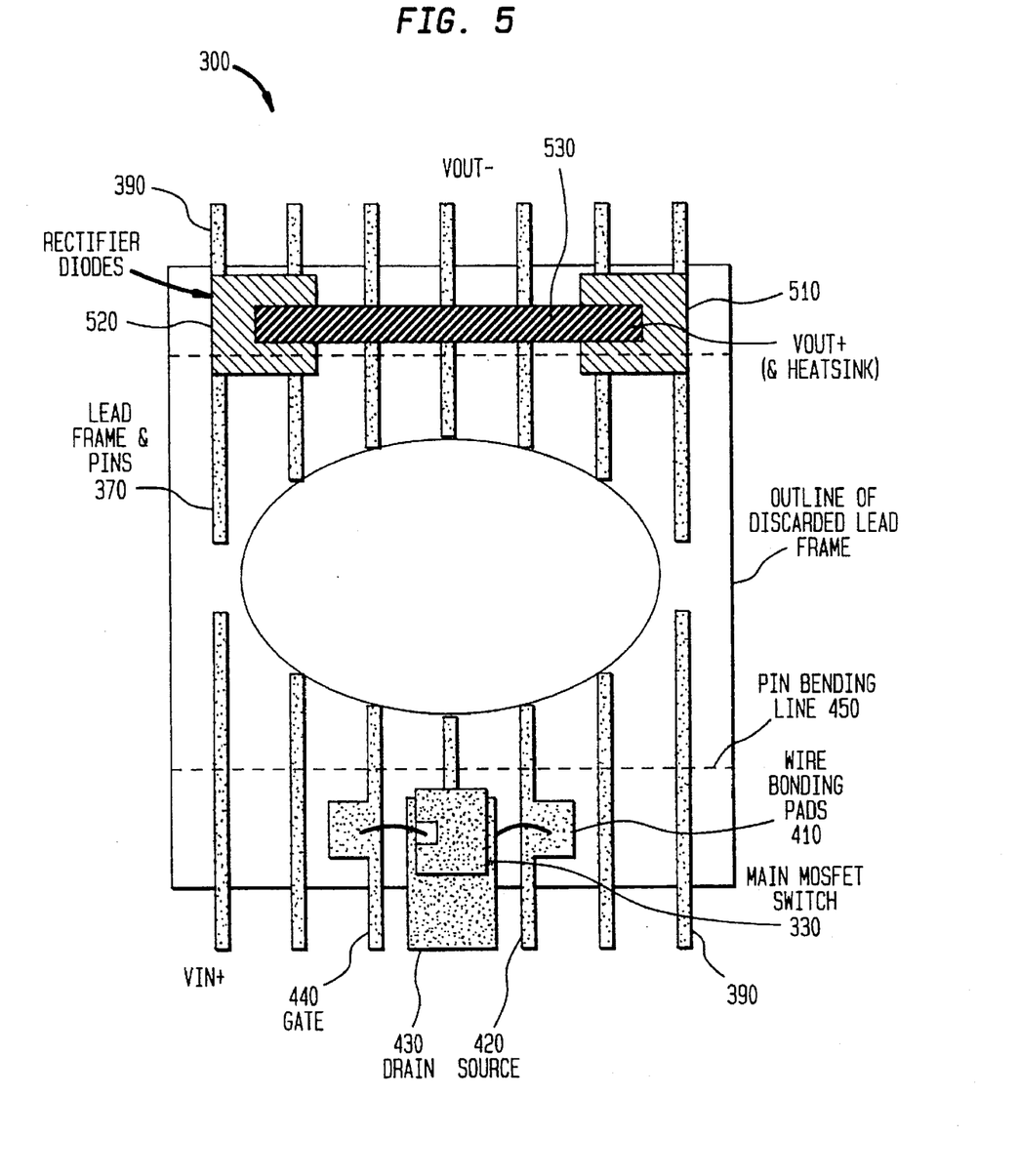
FIG. 5 illustrates a bottom view of the integrated power circuitry of FIG. 3.

Turning now to FIG. 5, illustrated is a bottom view of the integrated power circuitry (i.e., the integrated power magnetic device) 300 of FIG. 3. The illustrated embodiment presents the switch 330, including the source 420, drain 430 and gate 440 electrodes, the rectifier comprising rectifier diodes 510, 520 and a heat sink 530, coupled to the rectifier diodes 510, 520. The heat sink 530 provides thermal transfer within the integrated power magnetic device 300. The lead frame 370 provides the foundation for the integrated power magnetic device 300. The mounting pins 390 provide the mechanism for the attachment of the windings (not shown), and the control (via the gate electrode 440) and input and output voltages $V_{in}$, $V_{out}$; the mounting pins also provide the mounting leads to a circuit board of a power supply incorporating the integrated power magnetic device 300. Additionally, the wire bonding pads 410 provide a planar soldering surface for the source 420 and gate 440 electrodes of the switch and the pin bending line 450 provides a bending location for the mounting pins 390.

Again, the lead frame 370 provides the foundation for the integrated power magnetic device 300. The source 420 and gate 440 electrodes of the switch are wire bonded in advance to the wire bonding pads 410 of the lead frame 370. Assembly techniques for the switch and rectifier die include, for instance, inert/reducing atmospheres of nitrogen and hydrogen ranging from 0–100% to 100–0%, respectively. The solder attachment of the switch 330 (via the drain electrode 430) to the lead frame 370 provides the use of suitable solder to prevent dissolution of die metallization. The solder should be formulated with liquidus temperatures that are a certain margin over the surface mount solder temperatures. Again, the thermoset molding compound is used to encapsulate the integrated power magnetic device 300 and thereby provides environmental protection for the semiconductor die of the switch 330 and rectifier diodes 510, 520. After encapsulation, the leads remain connected to one another on the lead frame 370 through the dam bars and rails. A conventional trim-and-form process isolates and forms the package leads for surface mount connections to the circuit board (see FIG. 3).

Referring to FIGS. 3–5, the lead frame 370 is used for the dual purpose of mounting the multi-layer flexible transformer windings 310, 320 on one side and to mount the semiconductors (i.e., switch 330 and rectifier diodes 510, 520), in their bare die form, on to appropriately designated pads 410 on the bottom side. The assembly generally consists of hybrid solder/wire bond operations. Due to the high currents in the rectifier 340, the rectifier diodes 510, 520 should be soldered to the lead frame 370 and heat sink 530. The switch 330 should be soldered via its drain connection 430 to the lead frame 370. The source and gate connections 420, 440 are wire bonded to the lead frame 370. The wire bonding pads 410 may be plated with an appropriate metal or alloy for wire bonding (e.g. silver or nickel).

After assembly, the integrated power magnetic device 300 is encapsulated in a thermoset plastic molding compound using a mold designed to create the surface mountable heat sink 530 and mounting pins 390. The power terminals of the anodes are no longer accessible, providing a low resistance conduction path. However, external pins are available to provide low level sensing and snubbing functions. Overall, the new device generally occupies the same footprint and volume of an individual transformer, giving a space savings of an entire dual pack of diodes (e.g., 0.780"×0.586") and switch (e.g., a power switch FET of dimension 0.63"×0.24"). This reduces the occupied area from approximately 1.68 in$^2$ to 1.07 in$^2$, a potential reduction in a range of 36%. One of ordinary skill in the art should understand that other construction techniques and embodiments incorporating the principles of the present invention are well within the scope of the present invention.

Although the present invention has been described in detail, those skilled in the art should understand that they can make various changes, substitutions and alterations herein without departing from the spirit and scope of the invention in its broadest form.

What is claimed is:

1. A power magnetic device, comprising:
   an isolation transformer having a primary winding and a secondary winding;
   a switch coupled to said primary winding;
   a rectifier coupled to said secondary winding; and
   an encapsulant substantially surrounding said isolation transformer, said switch and said rectifier to join said isolation transformer, said switch and said rectifier into an integrated package, said integrated package having:
   a first power input coupled to a first end of said primary winding,
   a second power input coupled to said switch,
   first and second power outputs coupled to said rectifier circuit, and
   a control input coupled to said switch, said control input allowing said switch to be controlled to couple said primary winding to a source of electrical power, said power magnetic device thereby capable of employing said isolation transformer and said rectifier to convert electrical power into DC electrical power.

2. The power magnetic device as recited in claim 1 further comprising a heat sink coupled to said secondary winding of said isolation transformer for thermal transfer therebetween.

3. The power magnetic device as recited in claim 1 further comprising a lead frame containing said first and second power inputs and outputs and said control input and wherein a first terminal of said switch is soldered to said lead frame and second and third terminals of said switch are wire bonded to said lead frame.

4. The power magnetic device as recited in claim 1 wherein said switch is a field-effect transistor (FET).

5. The power magnetic device as recited in claim 1 wherein said rectifier comprises a plurality of diodes.

6. The power magnetic device as recited in claim 1 wherein said encapsulant is a thermosetting epoxy molding compound.

7. The power magnetic device as recited in claim 1 further comprising power supply circuitry, said power magnetic device and power supply circuitry surrounded by said encapsulant thereby forming a power supply module.

8. A method of manufacturing a power magnetic device, comprising the steps of:
   providing an isolation transformer having a primary winding and a secondary winding;
   coupling a switch to said primary winding;
   coupling a rectifier to said secondary winding; and
   substantially surrounding said isolation transformer, said switch and said rectifier with an encapsulant to join said isolation transformer, said switch and said rectifier into an integrated package, said integrated package having:
   a first power input coupled to a first end of said primary winding,
   a second power input coupled to said switch,
   first and second power outputs coupled to said rectifier circuit, and
   a control input coupled to said switch, said control input allowing said switch to be controlled to couple said primary winding to a source of electrical power, said power magnetic device thereby capable of employing said isolation transformer and said rectifier to convert electrical power into DC electrical power.

9. The method as recited in claim 8 further comprising the step of coupling a heat sink to said secondary winding of said isolation transformer for thermal transfer therebetween.

10. The method as recited in claim 8 wherein a lead frame contains said first and second power inputs and outputs and said control input, said method further comprising the steps of:

soldering a first terminal of said switch to said lead frame; and wire bonding second and third terminals of said switch to said lead frame.

11. The method as recited in claim 8 wherein said switch is a field-effect transistor (FET).

12. The method as recited in claim 8 wherein said rectifier comprises a plurality of diodes.

13. The method as recited in claim 8 wherein said encapsulant is a thermosetting epoxy molding compound.

14. The method as recited in claim 8 further comprising the step of coupling power supply circuitry to said power magnetic device, said power magnetic device and power supply circuitry surrounded by said encapsulant thereby forming a power supply module.

15. A power converter, comprising:

control circuitry for applying control signals to a power train; and a power train having a power train input couplable to a source of electrical power and a power train DC output couplable to an electrical load, said power train including:

an integrated power magnetic device having:

an isolation transformer having a primary winding and a secondary winding;

a switch coupled to said primary winding;

a rectifier coupled to said secondary winding;

an encapsulant substantially surrounding said isolation transformer, said switch and said rectifier to join said isolation transformer, said switch and said rectifier into an integrated package, said integrated package having:

a first power input coupled to a first end of said primary winding, a second power input coupled to said switch, first and second power outputs coupled to said rectifier circuit, and a control input coupling said control circuitry to said switch, said control input allow circuitry to control circuitry to control said switch to couple said primary winding to said source of electrical power, said power magnetic device thereby capable of employing said isolation transformer and said rectifier to convert electrical power into DC electrical power.

16. The power converter as recited in claim 15 further comprising a heat sink coupled to said secondary winding of said isolation transformer for thermal transfer therebetween.

17. The power converter as recited in claim 15 further comprising a lead frame containing said first and second power inputs and outputs and said control input and wherein a first terminal of said switch is soldered to said lead frame and second and third terminals of said switch are wire bonded to said lead frame.

18. The power converter as recited in claim 15 wherein said switch is a field-effect transistor (FET).

19. The power converter as recited in claim 15 wherein said rectifier comprises a plurality of diodes.

20. The power converter as recited in claim 15 wherein said encapsulant is a thermosetting epoxy molding compound.

21. The power converter as recited in claim 15 wherein said power train comprises a low-pass filter.

\* \* \* \* \*